C. SCHEUNER.
SPRING WHEEL.
APPLICATION FILED OCT. 19, 1910.

1,007,392.

Patented Oct. 31, 1911.

2 SHEETS—SHEET 1.

Witnesses
Stuart Hilder.
Frances M. Anderson.

Inventor
Charles Scheuner
by E. W. Anderson & Son.
his Attorneys

C. SCHEUNER.
SPRING WHEEL.
APPLICATION FILED OCT. 19, 1910.
1,007,392.
Patented Oct. 31, 1911.
2 SHEETS—SHEET 2.
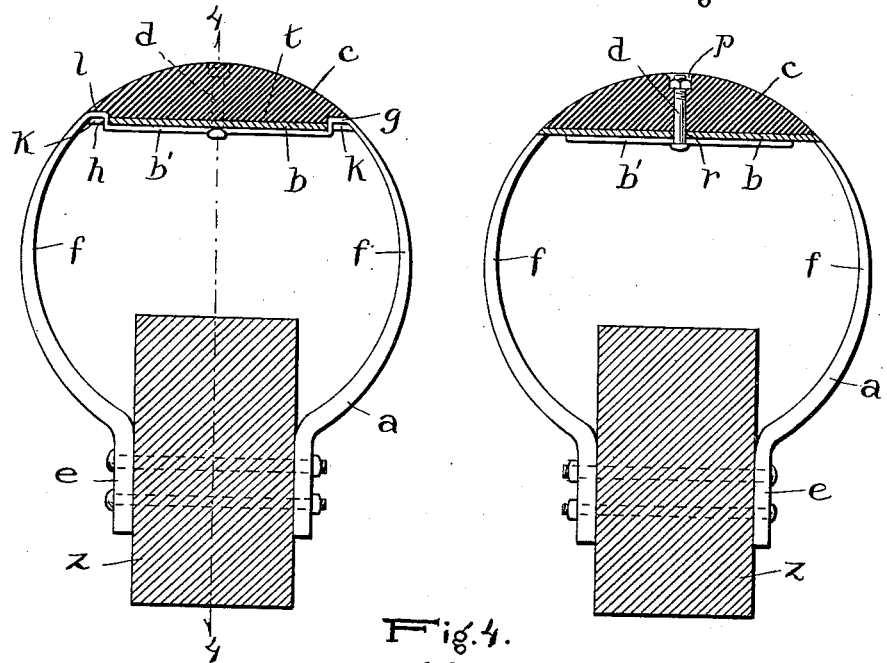
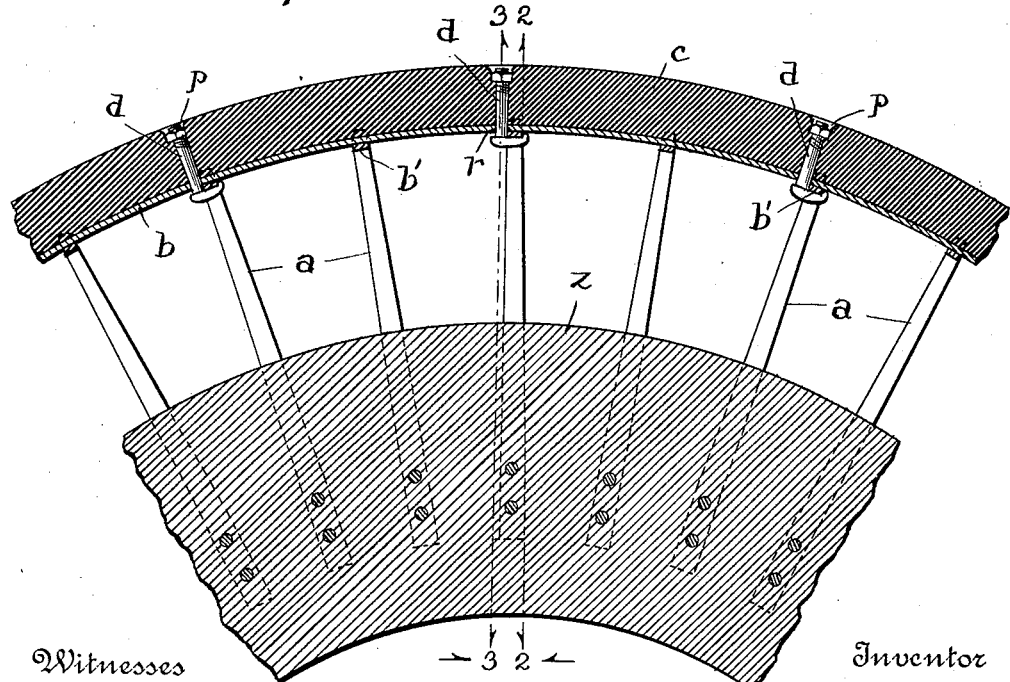

UNITED STATES PATENT OFFICE.

CHARLES SCHEUNER, OF CHICAGO, ILLINOIS.

SPRING-WHEEL.

1,007,392.  Specification of Letters Patent.  Patented Oct. 31, 1911.

Application filed October 19, 1910. Serial No. 587,962.

*To all whom it may concern:*

Be it known that I, CHARLES SCHEUNER, a citizen of the United States, resident of Chicago, in the county of Cook and State of Illinois, have made a certain new and useful Invention in Spring-Wheels; and I declare the following to be a full, clear, and exact description of the same, such as will enable others skilled in the art to which it appertains to make and use the invention, reference being had to the accompanying drawings, and to letters or figures of reference marked thereon, which form a part of this specification.

Figure 1:
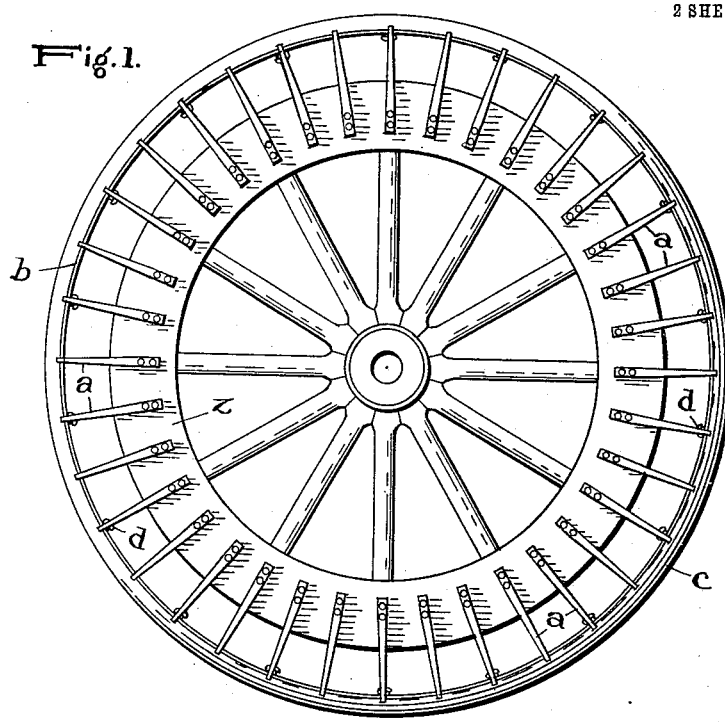
Figure 5:
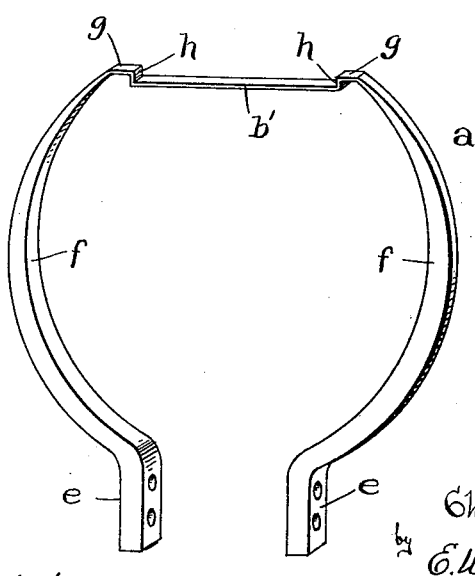

Figure 1 is a side view of a wheel having my invention applied thereto. Fig. 2 is a section on the line 2—2, Fig. 4. Fig. 3 is a section on the line 3—3, Fig. 4. Fig. 4 is a central longitudinal section of a portion of my tire as applied to a wheel. Fig. 5 is a detail perspective view of one of the spring supports.

The invention relates to spring wheels, and it consists in the novel construction and combinations of parts as hereinafter set forth.

The object of the invention is mainly to provide a spring wheel of economical and durable character, the tread surface of which will not be liable to casual injury through contact with pieces of glass, tacks, or other sharp articles lying on the road.

In the accompanying drawings, illustrating the invention, the letter $a$, designates lateral radial spring supports, which are designed to be secured to the sides of the perimeter of the wheel body $z$.

The annular spring connection plate is indicated at $b$.

$c$, designates the annular tread or shoe.

$d$, represents a bolt.

The spring supports $a$, usually of steel, are arranged at regular distances apart, and are provided with transverse bearing bars $b'$, set inward to receive the spring connection plate $b$, and the tread $c$. The annular tread or shoe $c$, is secured to the plate $b$, and to the spring supports by means of the bolts $d$.

The number of spring supports required for a wheel may vary according to their width, those which are narrower being more flexible and more responsive to the working conditions. The spring supports are preferably placed in series around the wheel body, and each support consists of a piece of steel of outward bowed form, having at its outer portion the inward offset cross bar $b'$ and having end portions in the form of planular extensions $e$, which are thick enough to provide firm shanks adapted to engage the sides of the felly or marginal portion of the wheel body. These are provided with bolt holes. From these thicker attachment portions toward the outer part of the spring support, it is designed to be made thinner, and especially so from the middle of the lateral bow portion $f$, outward, this portion terminating in a horizontal bend $g$ having a vertical inwardly extending shoulder bearing $h$, from which the transverse bar $b'$ extends to the opposite shoulder bearing of said support. By making the outer portions of the support thinner it is made more easily yielding and elastic in these parts. The bends $g$, are designed to engage slots of the spring plate $b$.

The spring plate $b$, is made of proper length to extend around the wheel at a sufficient distance to engage all the spring supports, which are arranged in series around the wheel and engage the marginal slots $k$, of the plate. The plate is bent in annular shape and its ends are brought together and welded or otherwise fastened to each other, so that the members of the annular series of radially extending spring supports are held in their proper relative serial position by engagement with the marginal slots or notches of said plate, which forms the bottom of an annular recess or depression $t$, of which the bearings $h$, form the sides.

The annular tread or shoe $c$, is designed to be of plano-convex shape in cross-section, and is usually made of rubber. It is designed to be seated in the annular recess $t$, upon the spring plate $b$, and between the bearings $h$ of the spring supports. It is preferably provided with rabbeted inner bearings 1, to engage the bearings of the spring supports, and bolt holes $p$, are provided at regular distances through the annular tread for the passage of the bolts $d$, which are preferably of hook-headed form to engage the spring supports. These bolts are designed to extend through holes $r$, of the spring plate, and are secured by means of nuts.

When the annular tread is secured on the spring plate in position upon the spring supports, and the latter are fastened to the marginal portion of the wheel, there is provided a substantial round-surface tire of firm character in its inner portion, or those parts which are fastened to the wheel, and having especially elastic and yielding character in the part which extends toward the annular tread, or where the more delicate outer portions of the spring supports are in more or less movable engagement with the spring plate. In this wise it is designed that this plate shall serve not only to hold the spring supports in yielding connection, but also to hold them in proper relative position; the tread being comparatively thicker in cross-section than the springs, giving strength and durability to the bearing portions of the tire.

Having described the invention, what I claim and desire to secure by Letters Patent is:

A spring wheel comprising a felly provided with an annular series of radial separated spring supports having inward offset straight transverse portions and shoulders at the ends of said transverse portions, an annular spring plate of straight form in cross section located upon said transverse portions and having marginal open end slots engaging said shoulders, an annular tread strip located upon said spring plate and having radial perforations, and radial bolts engaging said perforations and provided with hook ends engaging under said transverse portions.

In testimony whereof I affix my signature, in presence of two witnesses.

CHARLES SCHEUNER.

Witnesses:
L. T. REIGSTAD,
FRANK HOLFT.

Copies of this patent may be obtained for five cents each, by addressing the "Commissioner of Patents, Washington, D. C."